United States Patent
Jackson et al.

(10) Patent No.: US 11,847,637 B2
(45) Date of Patent: Dec. 19, 2023

(54) DATABASE WITH DATA INTEGRITY MAINTENANCE

(71) Applicant: Stripe, Inc., San Francisco, CA (US)

(72) Inventors: Carl Jackson, San Francisco, CA (US); Peter Bakkum, San Francisco, CA (US); Usman Masood, San Francisco, CA (US)

(73) Assignee: STRIPE, INC., San Francisco, CA (US)

( * ) Notice: Subject to any disclaimer, the term of this patent is extended or adjusted under 35 U.S.C. 154(b) by 412 days.

(21) Appl. No.: 17/095,552

(22) Filed: Nov. 11, 2020

(65) Prior Publication Data
US 2022/0147977 A1    May 12, 2022

(51) Int. Cl.
G07F 19/00    (2006.01)
G06Q 20/36    (2012.01)
G06F 16/13    (2019.01)
G06F 16/23    (2019.01)
G06Q 50/06    (2012.01)
H04L 9/06     (2006.01)
G06Q 40/02    (2023.01)

(52) U.S. Cl.
CPC ....... *G06Q 20/3676* (2013.01); *G06F 16/134* (2019.01); *G06F 16/2365* (2019.01); *G06Q 40/02* (2013.01); *G06Q 50/06* (2013.01); *H04L 9/0643* (2013.01); *G06Q 2220/00* (2013.01); *H04L 2209/56* (2013.01)

(58) Field of Classification Search
CPC .......................... G06Q 20/3676; G06Q 40/12
See application file for complete search history.

(56) References Cited

U.S. PATENT DOCUMENTS

| | | | | |
|---|---|---|---|---|
| 8,886,570 B1 * | 11/2014 | Amancherla | ...... | G06Q 20/4016 235/382 |
| 2016/0260169 A1 * | 9/2016 | Arnold | ................ | G06Q 20/381 |
| 2017/0228731 A1 * | 8/2017 | Sheng | ................... | G06Q 20/36 |

* cited by examiner

*Primary Examiner* — Rokib Masud
(74) *Attorney, Agent, or Firm* — Foley & Lardner LLP (57) ABSTRACT

A method for maintaining database integrity comprises: receiving event data from a producer; converting the received event data to a standard set of ledger entries; publishing the converted entries to a database; determining if two accounts in the database balance out; performing a remedial action to maintain the database integrity if the accounts do not balance.

21 Claims, 8 Drawing Sheets

FIG. 8

DATABASE WITH DATA INTEGRITY MAINTENANCE

FIELD

The subject matter disclosed herein generally relates to the technical field of databases and more specifically, systems and methods for maintaining database integrity.

BACKGROUND

The present subject matter seeks to address technical problems existing in conventional databases. For example, database integrity failures can cause multiple problems depending on the industry. In the financial industry, a failure can cause regulatory compliance issues. In the manufacturing industry, a failure may cause manufacturing stoppages. In the energy industry, a failure may cause a brownout or blackout.

BRIEF SUMMARY

The present disclosure relates generally to databases.

In some examples, a method for maintaining database integrity comprises receiving event data from a producer; converting the received event data to a standard set of ledger entries: publishing the converted entries to a database; determining if two accounts in the database balance out; performing a remedial action to maintain the database integrity if the accounts do not balance. In an example, the method further comprises transmitting a data integrity violation alert to the producer if the accounts do not balance. In another example, the method further comprises receiving a second event data from the producer in response to the data integrity violation alert, and performing the remedial action based on the received second event data.

The remedial action may comprise adjusting one of the two accounts to a zero balance if a value in the one account is less than a threshold value. The event data may include the transfer of fungible commodities, such as electricity or oil. The publishing may include subtracting from one of the two accounts and adding to a second of the two accounts.

In an example, a system for maintaining database integrity comprises one or more hardware processors; and a memory storing instructions that, when executed by at least one processor among the processors, cause the system to perform the example methods. In another example, a non-transitory machine-readable medium comprises instructions which, when read by a machine, cause the machine to perform the example methods for maintaining database integrity.

BRIEF DESCRIPTION OF THE SEVERAL VIEWS OF THE DRAWINGS

Some embodiments are illustrated by way of example and not limitation in the views of the accompanying drawing.

DETAILED DESCRIPTION

"Carrier Signal", in this context, refers to any intangible medium that is capable of storing, encoding, or carrying instructions for execution by a machine, and includes digital or analog communication signals or other intangible media to facilitate communication of such instructions. Instructions may be transmitted or received over a network using a transmission medium via a network interface device and using any one of a number of well-known transfer protocols.

"Client Device"" or "Electronic Device", in this context, refers to any machine that interfaces to a communications network to obtain resources from one or more server systems or other client devices. A client device may be, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, or any other communication device that a user may use to access a network.

"Customer's Electronic Device" or "Electronic User Device", in this context, refers to a client device that a customer uses to interact with a merchant. Examples of this device include a desktop computer, a laptop computer, a mobile device (e.g., smartphone, tablet), and a game console. The customer's electronic device may interact with the merchant via a browser application that executes on the customer's electronic device or via a native app installed onto the customer's electronic device. The client-side application executes on the customer's electronic device.

"Communications Network", in this context, refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"Component", in this context, refers to a device, physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device, or other tangible medium able to store instructions and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor", in one context, refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor may further be a multi-core processor having two or more independent processors (sometimes referred to as "cores") that may execute instructions contemporaneously.

In another context, a "Processor" is a company (often a third party) appointed to handle payment card (e.g., credit card, debit card) transactions. They have connections to various card networks and supply authorization and settlement services to merchants or payment service providers. In aspects, they can also move the money from an issuing bank to a merchant or acquiring bank.

"Card Network" (or "Card Association"), in this context, refers to financial payment networks such as Visa®, MasterCard®, American Express®, Diners Club®, JCB®, and China Union-Pay®.

"Acquiring Bank" or "Acquirer", in this context, refers to a bank or financial institution that accepts credit and/or debit card payments from affiliated card networks for products or services on behalf of a merchant or payment service provider.

"Card Issuing Bank" or "Issuing Bank", in this context, refers to a bank that offers card network or association-branded payment cards directly to consumers. An issuing bank assumes primary liability for the consumer's capacity to pay off debts they incur with their card.

"Payment Information" includes information required to complete a transaction, and the specific type of information provided may vary by payment type. Some payment information will be sensitive (e.g., the card validation code), while other information might not be (e.g., zip code). For example, when a payment is made via a credit card or debit card, the payment information includes a primary account number (PAN) or credit card number, card validation code, and expiration month and year. In another payment example, made using an Automated Clearinghouse (ACH) transaction for example, the payment information includes a bank routing number and an account number within that bank.

"Sensitive information" may not necessarily be related to payment information and may include other confidential personal information, such as medical (e.g., HIPAA) information, for example. The ambit of the term "Payment Information" includes "Sensitive Information" within its scope. In some examples, sensitive payment information may include "regulated payment information," which may change over time. For example, currently a merchant cannot collect more than the first six (6) or the last four (4) numbers of a customer's PAN without generally needing to comply with Payment Card Industry (PCI) regulations. But card number lengths may change, and when they do, the "6 and 4" rules will likely change with them. These potential future changes are incorporated within the ambit of "regulated payment information," which is, in turn, included within the ambit of the term "payment information" as defined herein.

"Native Application" or "native app", in this context, refers to an app commonly used with a mobile device, such as a smartphone or tablet. When used with a mobile device, the native app is installed directly onto the mobile device. Mobile device users typically obtain these apps through an online store or marketplace, such as an app store (e.g., Apple's App Store, Google Play store). More generically, a native application is designed to run in the computer environment (machine language and operating system) that it is being run in. It can be referred to as a "locally installed application." A native application differs from an interpreted application, such as a Java applet, which requires interpreter software. A native application also differs from an emulated application that is written for a different platform and converted in real time to run, and a web application that is run within the browser.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2011-2020, Stripe, Inc., All Rights Reserved.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail. In this specification, the terms "user", "cardholder", and "consumer" are used interchangeably unless the context indicates otherwise.

Figure 1:
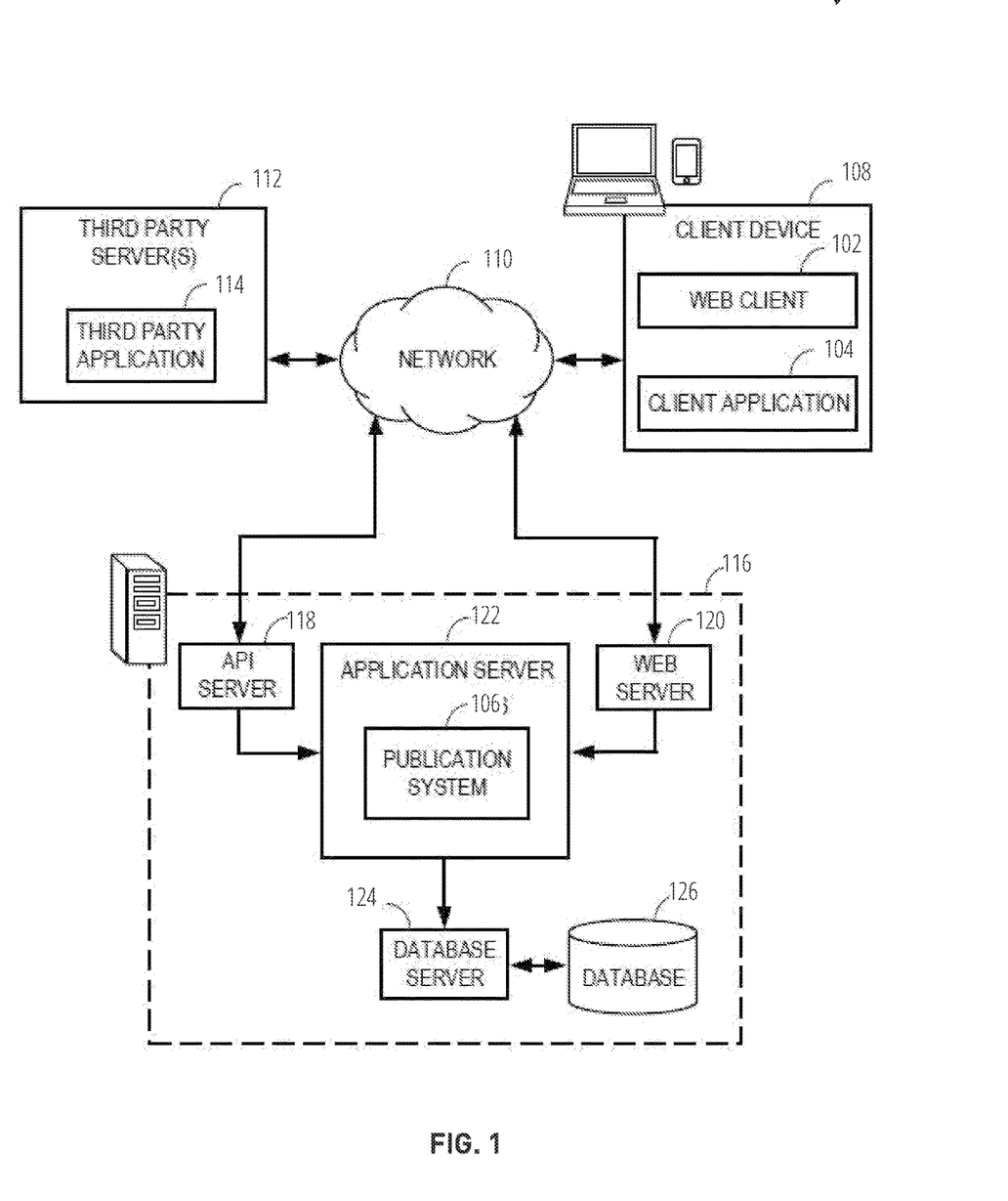
FIG. 1 is a block diagram illustrating a networked system, according to some example embodiments.

With reference to FIG. 1, an example embodiment of a high-level SaaS network architecture 100 is shown. A networked system 116 provides server-side functionality via a network 110 (e.g., the Internet or a WAN) to a client device 108. A web client 102 and a programmatic client, in the example form of a client application 104, are hosted and execute on the client device 108. The networked system 116 includes an application server 122, which in turn hosts a publication system 106 (such as the publication system hosted at https://stripe.com by Stripe, Inc. of San Francisco, CA (herein "Stripe") as an example of a payment processor) that provides a number of functions and services to the client application 104 that accesses the networked system 116. The client application 104 also provides a number of interfaces described herein, which present output of push payment decision routing to a user of the client device 108.

The client device 108 enables a user to access and interact with the networked system 116 and, ultimately, the publication system 106. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An API server 118 and a web server 120 are coupled, and provide programmatic and web interfaces respectively, to the application server 122. The application server 122 hosts the publication system 106, which includes components or applications described further below. The application server 122 is, in turn, shown to be coupled to a database server 124 that facilitates access to information storage repositories (e.g., a database 126). In an example embodiment, the database 126 includes storage devices that store information accessed and generated by the publication system 106.

Additionally, a third-party application 114, executing on one or more third-party servers 112, is shown as having programmatic access to the networked system 116 via the programmatic interface provided by the API server 118. For example, the third-party application 114, using information retrieved from the networked system 116, may support one or more features or functions on a website hosted by a third party.

Turning now specifically to the applications hosted by the client device 108, the web client 102 may access the various systems (e.g., the publication system 106) via the web interface supported by the web server 120. Similarly, the client application 104 (e.g., an "app" such as a payment processor app) accesses the various services and functions provided by the publication system 106 via the programmatic interface provided by the API server 118. The client application 104 may be, for example, an "app" executing on the client device 108, such as an iOS or Android OS application to enable a user to access and input data on the networked system 116 in an offline manner and to perform batch-mode communications between the programmatic client application 104 and the networked system 116.

Further, while the SaaS network architecture 100 shown in FIG. 1 employs a client-server architecture, the present inventive subject matter is, of course, not limited to such an architecture, and could equally well find application in a distributed, or peer-to-peer, architecture system, for example. The publication system 106 could also be implemented as a standalone software program, which does not necessarily have networking capabilities.

Figure 2:
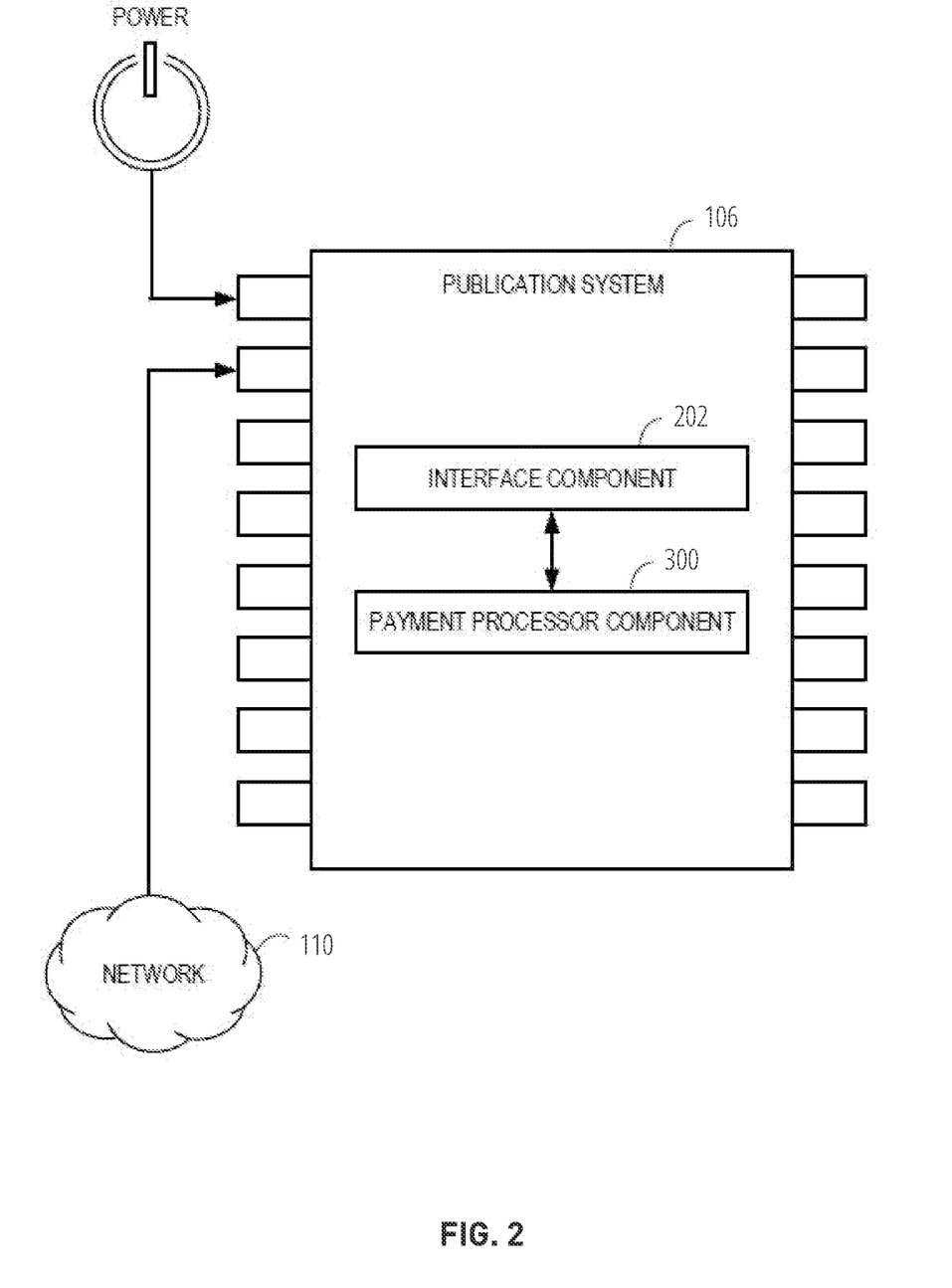
FIG. 2 is a block diagram showing architectural aspects of a publication system, according to some example embodiments.

FIG. 2 is a block diagram showing architectural details of a publication system 106, according to some example embodiments. Specifically, the publication system 106 is shown to include an interface component 202 by which the publication system 106 communicates (e.g., over a network 110) with other systems within the SaaS network architecture 100.

The interface component 202 is communicatively coupled to a payment processor component 300 that operates to provide push payment decision routing for a payment processor in accordance with the methods described herein with reference to the accompanying drawings.

Figure 3:
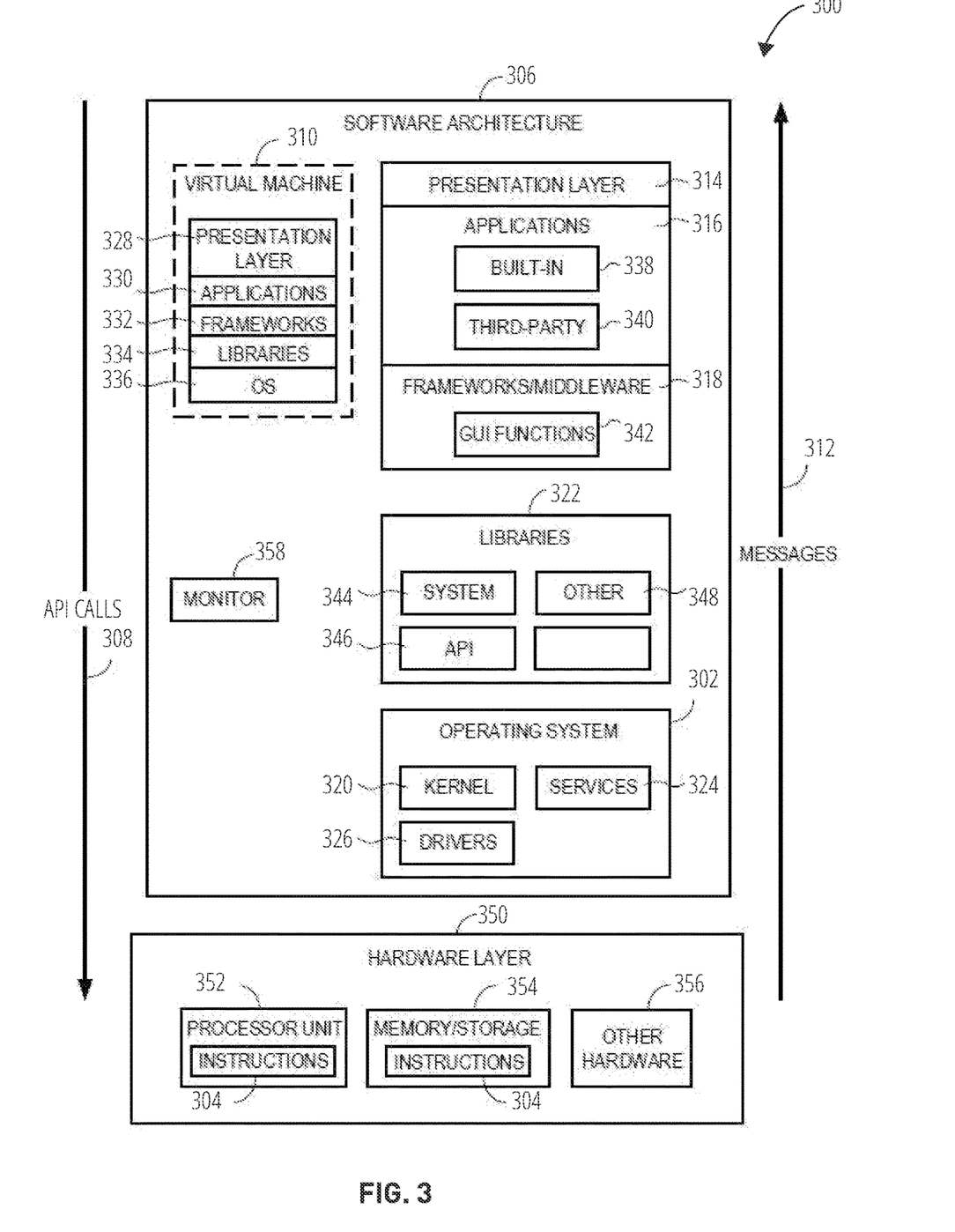
FIG. 3 is a block diagram illustrating a representative software architecture, which may be used in conjunction with various hardware architectures herein described

FIG. 3 is a block diagram illustrating an example software architecture 306, which may be used in conjunction with various hardware architectures herein described. FIG. 3 is a non-limiting example of a software architecture 306, and it will be appreciated that many other architectures may be implemented to facilitate the functionality described herein. The software architecture 306 may execute on hardware such as a machine 400 of FIG. 4 that includes, among other things, processors 404, memory/storage 406, and input/output (I/O) components 418. A representative hardware layer 350 is illustrated and can represent, for example, the machine 400 of FIG. 4. The representative hardware layer 350 includes a processor 352 having associated executable instructions 304. The executable instructions 304 represent the executable instructions of the software architecture 306, including implementation of the methods, components, and so forth described herein. The hardware layer 350 also includes memory and/or storage modules as memory/storage 354, which also have the executable instructions 304. The hardware layer 350 may also comprise other hardware 356.

In the example architecture of FIG. 3, the software architecture 306 may be conceptualized as a stack of layers where each layer provides particular functionality. For example, the software architecture 306 may include layers such as an operating system 302, libraries 322, frameworks/middleware 318, applications 316, and a presentation layer 314. Operationally, the applications 316 and/or other components within the layers may invoke API calls 308 through the software stack and receive a response as messages 312 in response to the API calls 308. The layers illustrated are representative in nature, and not all software architectures have all layers. For example, some mobile or special-purpose operating systems may not provide a frameworks/middleware 318, while others may provide such a layer. Other software architectures may include additional or different layers.

The operating system 302 may manage hardware resources and provide common services. The operating system 302 may include, for example, a kernel 320, services 324, and drivers 326. The kernel 320 may act as an abstraction layer between the hardware and the other software layers. For example, the kernel 320 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 322 provide a common infrastructure that is used by the applications 316 and/or other components and/or layers. The libraries 322 provide functionality that allows other software components to perform tasks in an easier fashion than by interfacing directly with the underlying operating system 302 functionality (e.g., kernel 320, services 324, and/or drivers 326). The libraries 322 may include system libraries 344 (e.g., C standard library) that may provide functions such as memory allocation functions, string manipulation functions, mathematical functions, and the like. In addition, the libraries 322 may include API libraries 346 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 322 may also include a wide variety of other libraries 348 to provide many other APIs to the applications 316 and other software components/modules.

The frameworks/middleware 318 provide a higher-level common infrastructure that may be used by the applications 316 and/or other software components/modules. For example, the frameworks/middleware 318 may provide various graphic user interface (GUI) functions 342, high-level resource management, high-level location services, and so forth. The frameworks/middleware 318 may provide a broad spectrum of other APIs that may be utilized by the applications 316 and/or other software components/modules, some of which may be specific to a particular operating system 302 or platform.

The applications 316 include built in applications 338 and/or third-party applications 340. Examples of representative built in applications 338 may include, but are not limited to, a contacts application, a browser application, a book reader application, a location application, a media application, a messaging application, and/or a game application. The third-party applications 340 may include any application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 340 may invoke the API calls 308 provided by the mobile operating system (such as the operating system 302) to facilitate functionality described herein.

The applications 316 may use built-in operating system functions (e.g., kernel 320, services 324, and/or drivers 326), libraries 322, and frameworks/middleware 318 to create user interfaces to interact with users of the system. Alternatively, or additionally, in some systems, interactions with a user may occur through a presentation layer, such as the presentation layer 314. In these systems, the application/component "logic" can be separated from the aspects of the application/component that interact with a user.

Some software architectures use virtual machines. In the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (e.g., the operating system 302 in FIG. 3) and typically, although not always, has a virtual machine monitor 358, which manages the operation of the virtual machine 310 as well as the interface with the host operating system (e.g., the operating system 302). A software architecture executes within the virtual machine 310 such as an operating system (OS) 336, libraries 334, frameworks 332, applications 330, and/or a presentation layer 328. These layers of software architecture executing within the virtual machine 310 can be the same as corresponding layers previously described or may be different.

Figure 4:
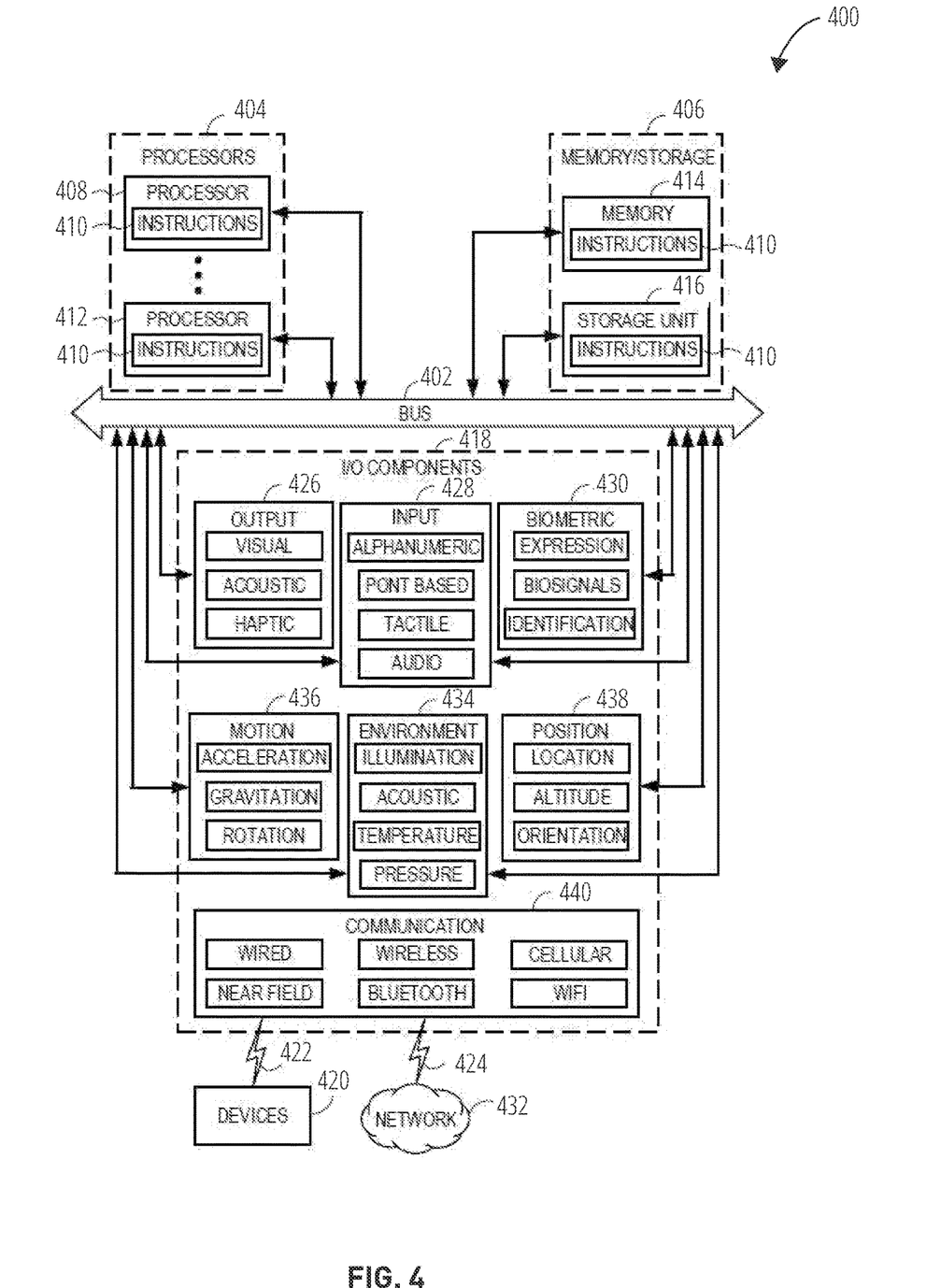
FIG. 4 is a block diagram illustrating components of a machine, according to some example embodiments, able to read instructions from a machine-readable medium (e.g., a machine-readable storage medium) and perform any one or more of the methodologies discussed herein.

FIG. 4 is a block diagram illustrating components of a machine 400, according to some example embodiments, able to read instructions 304 from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 410 (e.g., software, a program, an application, an applet, an app, or other executable code) for causing the machine 400 to perform any one or more of the methodologies discussed herein may be executed. As such, the instructions 410 may be used to implement modules or components described herein. The instructions 410 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404 (including processor 408 and processor 412), memory/storage 406, and I/O components 418, which may be configured to communicate with each other such as via a bus 402. The memory/storage 406 may include a memory 414, such as a main memory, or other memory storage, and a storage unit 416, both accessible to the processors 404 such as via the bus 402. The storage unit 416 and memory 414 store the instructions 410 embodying any one or more of the methodologies or functions described herein. The instructions 410 may also reside, completely or partially, within the memory 414, within the storage unit 416, within at least one of the processors 404 (e.g., within the processor's cache memory), or any suitable combination thereof, during execution thereof by the machine 400. Accordingly, the memory 414, the storage unit 416, and the memory of the processors 404 are examples of machine-readable media.

The I/O components 418 may include a wide variety of components to receive input, provide output, produce output, transmit information, exchange information, capture measurements, and so on. The specific I/O components 418 that are included in a particular machine 400 will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion, and the grouping is in no way limiting. In various example embodiments, the I/O components 418 may include output components 426 and input components 428. The output components 426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 418 may include biometric components 430, motion components 436, environment components 434, or position components 438, among a wide array of other components. For example, the biometric components 430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 436 may include acceleration sensor components (e.g., accelerometer), gravitation sensor components, rotation sensor components (e.g., gyroscope), and so forth. The environment components 434 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The/O components 418 may include communication components 440 operable to couple the machine 400 to a network 432 or devices 420 via a coupling 424 and a coupling 422, respectively. For example, the communication components 440 may include a network interface component or other suitable device to interface with the network 432. In further examples, the communication components 440 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 420 may be another machine or any of a wide variety of peripheral devices (e.g., a peripheral device coupled via a USB).

Moreover, the communication components 440 may detect identifiers or include components operable to detect identifiers. For example, the communication components 440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 440, such as location via Internet Protocol (IP) geo-location, location via Wi-Fi® signal triangulation, location via detecting an NFC beacon signal that may indicate a particular location, and so forth.

Figure 5:
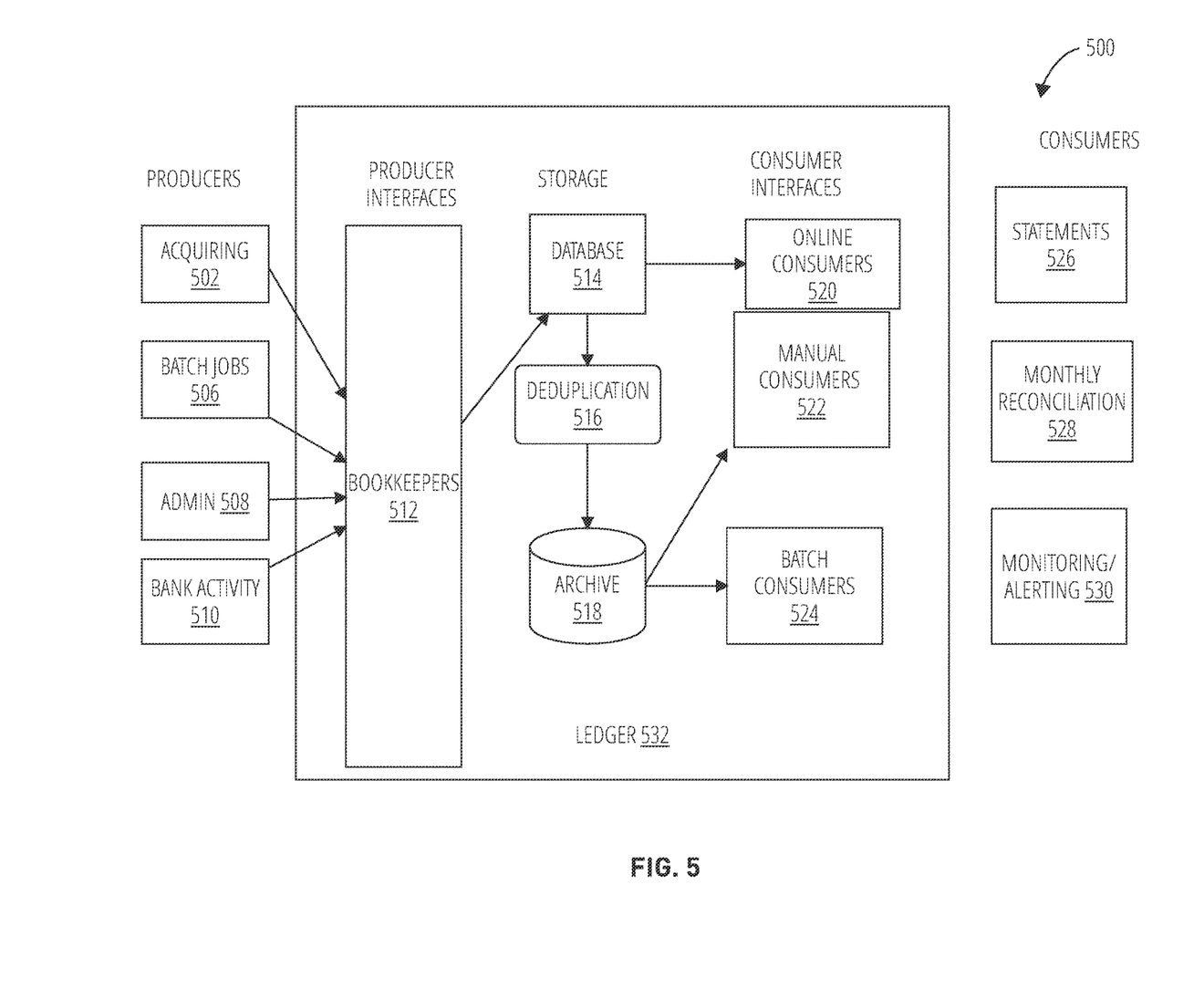
FIG. 5 is a block diagram illustrating components of a system for maintaining database integrity, according to some example embodiments.

FIG. 5 is a block diagram illustrating components of a system 500 for maintaining database integrity. The system 500 comprises data producers, a Ledger 532 and consumers. The producers may include an Acquiring 502, a Batch Jobs 506, an Admin 508, and a Bank Activity 510. The Ledger 532 includes product interfaces, storage and consumer interfaces. Producer interfaces include a Bookkeepers 512. Storage may include a Database 514, a Deduplication 516, and an Archive 518. Consumer interfaces may include an Online Consumers 520, a manual consumers 522, and a Batch Consumers 524. Consumers may include Statements 526, a Monthly Reconciliation 528, and a Monitoring/Alerting 530.

In an embodiment, the Ledger 532 is a double-entry accounting system, expressed in terms of a transaction log. The Ledger 532 may have three properties:

There is a common language for all flows.

Every transaction must balance (net to 0).

Transactions are immutable, and generally only affect the recent past. Exceptions include future-dated transactions in specific circumstances and writing older events when backfilling or migrating older data to a new schema.

The producers are APIs that can create events (transactions) including, in a financial application, charges or promise of funds to users in Acquiring 502. Batch Jobs 506 submit files for settlement or payouts. Admin 508 creates manual adjustments to user's balances. Bank Activity 510 creates bank transactions to accounts (e.g., credit card charge authorization).

The producers write events via producer interfaces, e.g., Bookkeepers 512. The Bookkeepers 512 transform an event into a standard set of Ledger transactions and publish those transactions to the Ledger 532. Bookkeepers 512 check critical invariants (examples: ensuring that the required fields are present, ensuring that the transaction nets to 0 for each ns and currency, ensuring the transaction adheres to a predefined schema (e.g., the account type names are whitelisted to move money between them, etc.)) before any entries are published to the Database 514. Deduplication 516 eliminates duplicated entries. Published entries are also archived in the Archive 518. Consumer interfaces enable consumer of data in the Database 514 access. These can include Online Consumers 520, manual consumers 522 and Batch Consumers 524. The consumers may view accessed data as Statements 526 (e.g., electricity distribution information), a Monthly Reconciliation 528, and/or Monitoring/Alerting 530.

Figure 6:
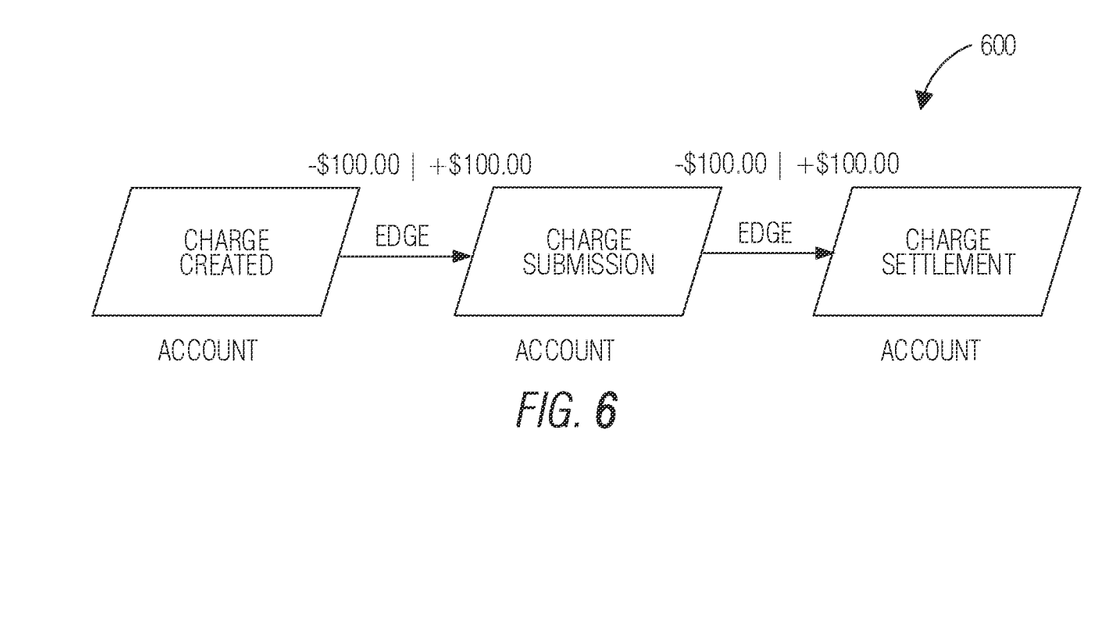
FIG. 6 illustrates an example of publishing a transaction to a database, according to some example embodiments.

FIG. 6 illustrates an example 600 of publishing a transaction to the Database 514 in accordance with one embodiment. The Ledger 532 uses a double-entry bookkeeping system, expressed in terms of an immutable transaction log, to record and validate all of events posted within the system 500.

For every flow (such as credit card charges or electricity disbursement), there are various events that occur (e.g., charge is created, charge is submitted, charge settlement). Ledger 532 models fungible items (e.g., money) flowing through different states (Ledger accounts). Each Ledger edge models fungible items flowing from one state to the next by subtracting counters from one account (debit), and adding it to another (credit). (These two operations should always sum to zero—embodiments model fungible items which cannot be created or destroyed in the embodiments, only moved around.)

This can be understood as a graph, where the nodes are Ledger accounts, connected by edges. An edge is then a pair of entries which add/subtract counters to a pair of Ledger accounts. A transaction is a grouping of one or more edges written to the Ledger at the same time (A single multi-edge transactions can be equivalent to a multiple single-edge transactions; this enables packaging multiple operations up in the same Ledger write).

For most Ledger accounts, they should eventually have a value of 0 (e.g., $0 in a financial application). By analogy, if accounts represent states, a balance "stuck" in a Ledger account represents money "stuck" in that state. Most of the states the system 500 are not terminal, so the accounts eventually have a 0 balance. If a specific ledger account has a 0 balance, it is referred to as clearing.

Clearing may also refer to expectations of specific instances of a Ledger account to clear. For example, the charge_unsubmitted Ledger account type is "clearing", because charge_unsubmitted identifies the state of having authorized but not submitted a charge. Because that is not meant to be a terminal state, that account will eventually clear. However, specific instances of that account for specific charges may clear, or may not clear, depending on whether that particular charge is stuck in the "not submitted" state.

For example, for a credit card charge the system 500 can track each change in state during its lifetime and ensure amounts are correctly entering/leaving (reconciling) each step of the way. As shown in FIG. 6, there are three accounts: Charge Created, Charge Submission and Charge Settlement. A value (counter) of 100 will leave one account and enter and adjacent account substantially simultaneously. Accordingly, the sum between two accounts at an edge should be zero, indicating data integrity in the Database 514. The charge created account counter is decremented by 100 while the charge submission counter is incremented by 100. Next, the charge submission account is decremented by 100 and the charge settlement account is incremented by 100. Accordingly, each event or transaction in the flow of database publications has a sum of zero at an edge between accounts indicating database integrity.

In an embodiment, the Database 514 in the Ledger 532 is composed of three types of object: Accounts, Entries, and Transactions. The Database 514 can be an unordered, append-only log of immutable Transactions. In a financial embodiment, financial activity is logged in the form of Transactions, which book credit or debits Entries to Accounts. A Transaction is a set of Entries that balance, and are published as a unit. It can have the following schema:
class Transaction<T::Struct
prop:id, String
prop:created_at, Integer
prop:effective_at, Integer
prop:entries, T::Array[Entry]
prop:metadata, T.nilable(T::Hash[String, String])
end Since the Database 514 is a double-entry system, the list of Entries must be even and balance. In particular, each (ns, currency) in a distinct sub-Ledger and must independently balance. Therefore, the list of Entries grouped by each Entry's Account ns and currency summed by each group should equal to affirm data integrity.

Timestamp fields represent time as a Unix timestamp (ie: seconds since 1970-01-01 00:00:00 UTC). All the timestamps for a transaction are rounded to second precision. All timestamps are timezone unaware.
 created_at: system clock time when the Transaction was created
 effective_at: time at which the activity being logged by the Transaction is believed to have taken place (typically derived from 3rd party reporting)

An Account is the unit at which the Ledger tracks balances. It could describe long-lived balances (nonclearing accounts), like a payment processor's bank accounts or revenue; or they can describe shorter-lived (clearing balances) assets or liabilities, like a specific pending charge or payout.

An account is represented as a T::Hash[String, String] hash. There are three properties that on every account:

| Key | Value |
| --- | --- |
| ns | The Ledger namespace. Each Stripe subsidiary has its own ledger namespace, and Stripe maintains a few other namespaces for merchant funds (which are legally owned by one of Stripe's banking partners) and fake/test mode merchants |
| currency | The currency, represented as a ISO 4217 currency code, this account is denominated in | type A tag describing how to interpret the remaining fields on the Account

Every account with a given type can have the same keys (i.e., they all fit the same schema), and this invariant should be preserved. In particular, this means that migrations that add or remove fields must select a different type name (potentially by including a version number).

Accounts should be selected to refer to objects that are as specific as possible, like individual charges and transfers, normally using a property named id. Occasionally it may be appropriate to denormalize some fields-like merchant-onto each Account, but otherwise each Account's attributes should be kept to a minimum.

Entries are adjustments made to the balance of an Account. They have the following schema:
class Entry<T::Struct
prop:amount, String
prop:account, T::Hash[String, String]
prop:metadata, T.nilable(T::Hash[String, String])
end The balance of the reference account is adjusted by the amount in the Entry. That is, a positive amount increments the balance of the Account, and a negative amount decrements it. The amount is a serialized decimal. The current balance of the Account is not taken into account, and in particular it is acceptable for an Entry to cause an Account whose balance is ordinarily positive to go negative (or vice versa). Since Accounts can only hold balances in one currency, the Entry is implicitly denominated in the currency of its associated Account.

An example published transaction follows:

```
{
"id": "d659bf06d6a9cacbed644eb3ac0d1f08-0-
008b3880176416a4b440abfb987e6984",
"created_at": 1524974072,
"effective_at": 1524841370,
"entries": [
{
"amount": "80.1",
"account": {
```

-continued

```
"currency": "gbp",
"id": "ch_1CKoDtE0sgUdrLhGATK1XsCw",
"merchant": "acct_17XqQqE0sgUdrLhG",
"ns": "fbo.eu",
"type": "charge_submitted"
},
"metadata": { }
},
{
"amount": "-80.1",
"account": {
"currency": "gbp",
"id": "ch_1CKoDtE0sgUdrLhGATK1XsCw",
"merchant": "acct_17XqQqE0sgUdrLhG",
"ns": "fbo.eu",
"type": "charge _unsubmitted"
}
},
"metadata": { }
],
"metadata": {
"action_id": "zamboniworker--020da35a5374108eb.northwest.stripe.io
/10b9-wefQP-29",
"clearing_request": "satts_1CLY602E0sgUdrLhGZ4j0et48",
"git_revision": "2acd8641",
"host": "zamboniworker--020da35a5374108eb.northwest.stripe.io",
"pid": "119540",
"s3_path":
"treasury/model_ingestion/acquiring/clearing/20180428/part-
00168",
"source": "model_ingestion",
"span_id": "680ad5ced1fad905",
"subtarget": "ingsubtrg_CldH6deO0yNQ1F",
"uid": "d94d9bdbe83391a167aa9c522e420e77"
}
}
```

Figure 7:
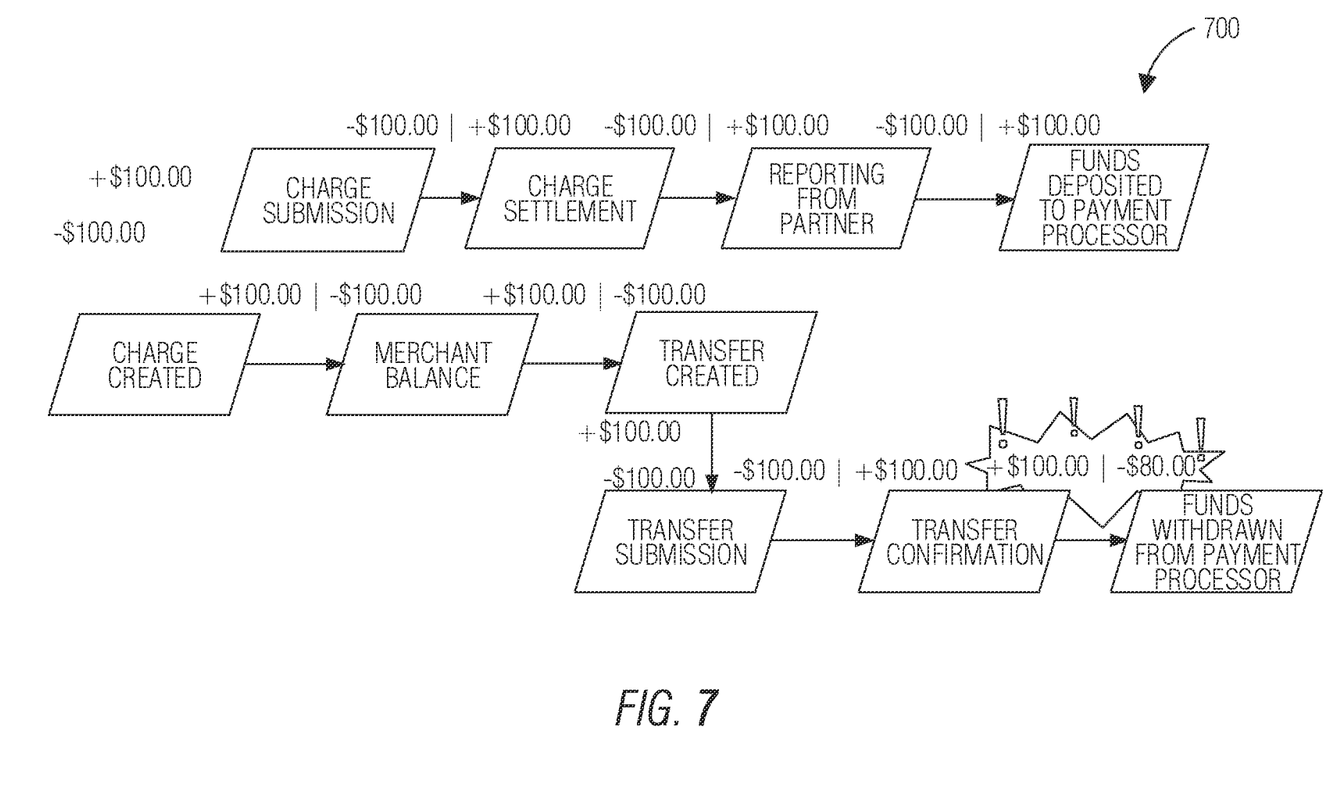
FIG. 7 illustrates an example of publishing a transaction to a database, according to some example embodiments.

FIG. 7 illustrates an example 700 of publishing a transaction to the Database 514 in accordance with one embodiment. The example 700 is similar to example 600 except at the final event in which there is a mismatch at an edge between a transfer confirmation account and fund withdrawn account. As can be seen, the transfer confirmation account was incremented by 100 while the funds withdrawn was decremented by only 80, indicating a data integrity error thereby negatively effecting the integrity of the Database 514. This error can be reported and remediated by method 800 as will be discussed in conjunction with FIG. 8.

Figure 8:
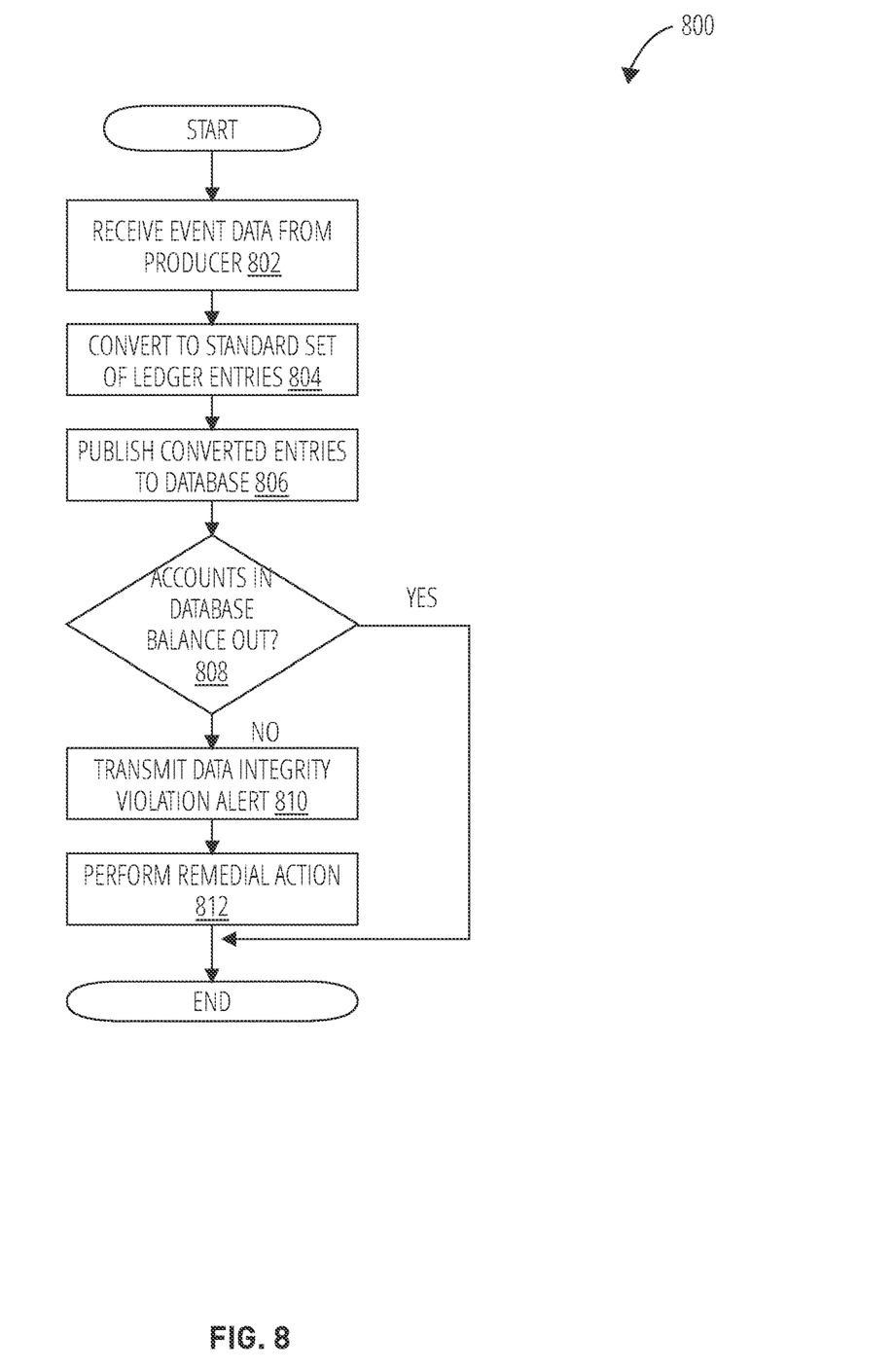
FIG. 8 illustrates a method of maintain data integrity in a database, according to some example embodiments.

FIG. 8 illustrates a method of to maintain data integrity in a database in accordance with one embodiment. The method 800 comprises receiving (block 802) event data from a producer; converting (block 804) the received event data to a standard set of ledger entries; publishing (block 806) the converted entries to a database (for example, to adjacent accounts sharing an edge); determining (decision block 808) if two accounts in the database balance out; and performing (block 812) a remedial action to maintain the database integrity if the accounts do not balance. The method 800 can further comprise transmitting (block 810) a data integrity violation alert to the producer or other entity if the accounts do not balance.

The method 800 may further comprise receiving a second event data from the producer in response to the data integrity violation alert, and performing the remedial action based on the received second event data.

The remedial action may comprise adjusting one of the two accounts to a zero balance if value in the one account is less than a threshold value (e.g., less than a fixed amount or percentage of original account value before transaction).

The event data may be the transfer of fungible commodities, such as electricity or oil, etc.

The publishing may comprise subtracting from one of the two accounts and adding to a second of the two accounts.

Some embodiments include machine-readable media including instructions 410 which, when read by a machine 400, cause the machine 400 to perform the operations of any one or more of the methodologies summarized above, or described elsewhere herein.

Although the subject matter has been described with reference to specific example embodiments, it will be evident that various modifications and changes may be made to these embodiments without departing from the broader scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for maintaining database integrity, the method comprising:
   receiving, by one or more processors coupled to non-transitory memory, event data from a producer, the event data having a format different from a predefined schema;
   converting, by the one or more processors, the received event data to a standard set of ledger entries according to the predefined schema, the standard set of ledger entries comprising a first edge object identifying a first relationship between a first account and a second account;
   publishing, by the one or more processors, the converted entries to a database by grouping the first edge object with a second edge object identifying a second relationship between the first account and the second account; and
   responsive to determining, by the one or more processors, based on a mismatch of a double-entry in ledger entries published to the database, that two accounts in the database do not balance out, performing, by the one or more processors, a remedial action to maintain the database integrity.

2. The method of claim 1, further comprising transmitting, by the one or more processors, a data integrity violation alert to the producer upon determining that the two accounts do not balance out.

3. The method of claim 2, further comprising:
receiving, by the one or more processors, a second event data from the producer in response to the data integrity violation alert; and
performing, by the one or more processors, the remedial action based on the received second event data.

4. The method of claim 1, where the remedial action comprises adjusting, by the one or more processors, one of the two accounts to a zero balance if a value in the one account is less than a threshold value.

5. The method of claim 1, wherein the event data includes a transfer of fungible commodities.

6. The method of claim 5, wherein the fungible commodities include electricity or oil.

7. The method of claim 1, wherein the publishing subtracts from one of the two accounts and adds to a second of the two accounts.

8. A system for maintaining database integrity, the system comprising:
one or more hardware processors; and
at least one memory storing instructions that, when executed by at least one processor among the processors, cause the system to perform operations comprising:
receiving event data from a producer, the event data having a format different from a predefined schema;
converting the received event data to a standard set of ledger entries according to the predefined schema, the standard set of ledger entries comprising a first edge object identifying a first relationship between a first account and a second account;
publishing the converted entries to a database by grouping the first edge object with a second edge object identifying a second relationship between the first account and the second account; and
responsive to determining, based on a mismatch of a double-entry in ledger entries published to the database, that two accounts in the database do not balance out, performing a remedial action to maintain the database integrity.

9. The system of claim 8, wherein the operations further comprise transmitting a data integrity violation alert to the producer upon determining that the accounts do not balance out.

10. The system of claim 9, wherein the operations further comprise:
receiving a second event data from the producer in response to the data integrity violation alert; and
performing the remedial action based on the received second event data.

11. The system of claim 8, where the remedial action comprises adjusting one of the two accounts to a zero balance if a value in the one account is less than a threshold value.

12. The system of claim 8, wherein the event data includes a transfer of fungible commodities.

13. The system of claim 12, wherein the fungible commodities include electricity or oil.

14. The system of claim 8, wherein the publishing subtracts from one of the two accounts and adds to a second of the two accounts.

15. A non-transitory machine-readable medium comprising instructions which, when read by a machine, cause the machine to perform operations for maintaining database integrity, the operations comprising, at least:
receiving event data from a producer, the event data having a format different from a predefined schema;
converting the received event data to a standard set of ledger entries according to the predefined schema, the standard set of ledger entries comprising a first edge object identifying a first relationship between a first account and a second account;
publishing the converted entries to a database by grouping the first edge object with a second edge object identifying a second relationship between the first account and the second account; and
responsive to determining, based on a mismatch of a double-entry in ledger entries published to the database, that two accounts in the database do not balance out, performing a remedial action to maintain the database integrity.

16. The medium of claim 15, wherein the operations further comprise transmitting a data integrity violation alert to the producer upon determining that the accounts do not balance out.

17. The medium of claim 16, wherein the operations further comprise:
receiving a second event data from the producer in response to the data integrity violation alert; and
performing the remedial action based on the received second event data.

18. The medium of claim 15, where the remedial action comprises adjusting one of the two accounts to a zero balance if a value in the one account is less than a threshold value.

19. The medium of claim 15, wherein the event data includes a transfer of fungible commodities.

20. The medium of claim 19, wherein the fungible commodities include electricity or oil.

21. The medium of claim 15, wherein the publishing subtracts from one of the two accounts and adds to a second of the two accounts.

* * * * *